United States Patent
Houst et al.

[11] 3,788,050
[45] Jan. 29, 1974

[54] IMPACT ABSORBER FOR ROTARY MOWER BLADE

[75] Inventors: Douglas R. Houst, Pattersonville; Kenneth R. Jones, Elnora; Bruce R. Laumeister, Rexford, all of N.Y.

[73] Assignee: General Electric Company, Erie, Pa.

[22] Filed: Apr. 9, 1973

[21] Appl. No.: 348,881

[52] U.S. Cl.................. 56/295, 30/347, 30/DIG. 6
[51] Int. Cl............................................. A01d 55/18
[58] Field of Search... 56/295, 255, 256, 17.5, 13.6, 56/13.7, 13.8, 16.7, 16.8, 16.9, 17.1, 17.2, 17.3, 17.4; 172/13–17; 30/DIG. 5, DIG. 6, 347

[56] References Cited
UNITED STATES PATENTS

| | | |
|---|---|---|
| 2,803,103 | 8/1957 | Kollman................................ 56/295 |
| 2,822,657 | 2/1958 | Chaffee................................ 56/295 |
| 3,133,398 | 5/1964 | Tatum.................................. 56/17.5 |
| 3,157,978 | 11/1964 | McMullen............................ 56/295 |
| 3,465,508 | 9/1969 | Edwards............................... 56/295 |
| 3,623,305 | 11/1971 | Freedlander et al................. 56/295 |
| 2,691,180 | 10/1954 | Pineles............................... 30/347 X |

*Primary Examiner*—Russell R. Kinsey
*Attorney, Agent, or Firm*—Dana F. Bigelow; Walter C. Bernkopf

[57] ABSTRACT

A resilient spacer element is inserted between the drive shaft mounting bolt and the central aperture of a horizontal cutting blade such that when one end of the rotating blade contacts a relatively immovable object the shear stress will cause the axis of the blade to shift relative to the axis of the shaft rather than break or bend the shaft and mounting bolt. The aperture and spacer are shaped such that a cavity exists therebetween on each side transverse to the blade, with the cavity decreasing in longitudinal cross section with increasing lateral distance from the blade center. As the spacer is displaced into the cavity, the degrees of elasticity is initially high and decreases with increased displacement.

14 Claims, 9 Drawing Figures

IMPACT ABSORBER FOR ROTARY MOWER BLADE

BACKGROUND OF THE INVENTION

This invention relates generally to rotary mowers and more particularly to devices for protecting the rotary shaft and drive components from harm due to impact of the blade against foreign objects.

It is common in power devices such as fans, propellers, and cutting blades to provide protective means for damage against torsional shear forces when the rotor strikes an obstacle. The devices may provide for the predicted failure of a replaceable part such as a shear pin, or for a cushioning effect as would be given by a resilient inter-member. In many applications the latter is superior to the former in that, in addition to providing relief against torsional stress a limited degree of relief is afforded against shear stresses.

Shear stresses, caused by continued movement of one end of a rotating blade when its opposite end impacts against an immovable object, may be more severe and cause more damage than accompanying torsional stresses. Typically, the result is a bent or broken shaft which involves a sizable investment of repair time and expense. Various schemes have been devised to afford the flexibility needed to prevent such an occurrence. Generally, they involve a mechanism which otherwise detracts from the overall design of the system, or involves complicated fixtures which are susceptible to maladjustment and disrepair.

It is therefore an object of this invention to provide an improved blade mounting arrangement for a rotary mower.

Another object of this invention is to provide for relief of shear stresses imparted to a drive shaft when an associated rotating blade strikes an immovable object.

Still another object of this invention is the provision for a protective mechanism which is extremely simple in construction, inexpensive to manufacture, and effective in use.

These objects and other features and advantages become more readily apparent upon reference to the following description when taken in conjunction with the appended drawings.

SUMMARY OF THE INVENTION

Briefly, in accordance with one aspect of the invention a resilient spacer element is placed between the rotatable drive shaft and the central aperture of the blade in such a manner as to provide cavities therebetween at the lateral sides thereof, and thus provide for limited elastic movement in the longitudinal plane of the blade and for greater elastic movement in the transverse plane thereof. The shape of the blade aperture is such that the longitudinal cross section decreases in length as the lateral distance from the aperture center is increased, thereby providing for an initial high degree of lateral elasticity followed by a steadily decreasing degree of elasticity. A typical aperture is diamond-shaped with the vertices aligned in the longitudinal and transverse planes. The associated spacer may be a truncated diamond having its lateral vertices removed to afford the desired cavities. The normal shear forces are spent by deformation and displacement of the spacer into the cavity nearest the object which is impacted.

In the drawings as hereinafter described, a preferred embodiment and modified embodiments are depicted; however, various other modifications and alternate constructions can be made thereto without departing from the true spirit and scope of the invention.

DESCRIPTION OF THE PREFERRED EMBODIMENT

Figure 1:
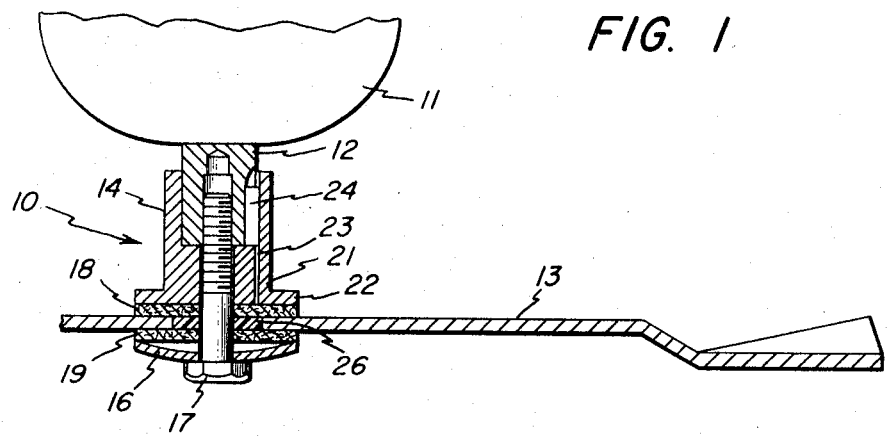
FIG. 1 is an elevational sectional view of a mower blade mounting apparatus in accordance with the preferred embodiment of this invention.

Referring now to FIG. 1 the invention is shown generally at 10 as a modification of a standard mower blade mounting arrangement in a rotary lawn mower having a motor 11 driving a shaft 12 for rapid rotation of a generally horizontally disposed cutting blade 13. The motor 11 being of the electrical or internal combustion type is commonly mounted on the mower housing (not shown) with the shaft 12 depending to a point near the ground below.

Attachment of the blade 13 is made by a clutch apparatus comprising a hub 14 rotatably secured to the shaft 12, a hub plate 16, and a bolt 17 threadably mounted in the core of the shaft 12 to bias the hub 14 and hub plate 16 together with the blade 13 disposed therebetween. A pair of fibre washers 18 and 19 are preferably installed as an interface between the blade and each of the hub 14 and hub plate 16. The hub 14 comprises a cylindrical body portion 21 and a flanged base portion 22, the body portion, at the upper section thereof, closely surrounding the shaft 12 and having a longitudinal slot 23 formed therein to receive a key 24 which mutually locks the shaft 12 and hub 14 from relative rotational movement. The key 24 is preferably of a soft material such s LEXAN to provide upon failure a release from such a locked condition when the relative torque between the hub 14 and the shaft 12 reaches a predetermined value.

The base portion 22 of the hub is a substantially planar member having a central hole formed therein for passing the bolt 17 therethrough. The fibre washer 18 is similar in geometry, and is similarly concentrically located with respect to the bolt 17. Below the blade 13 the fibre washer 19 and hub plate 16 are disposed in like manner and the bolt 17 passes through the entire combination to hold it together. A tightening of the bolt 17 compresses the blade between the fibre washers 18 and 19 to establish the frictional contact necessary to rotate the blade 13 in unison with the shaft 12. Should the blade be suddenly slowed or stopped by contact with a foreign obstacle during operation, the clutch arrangement will allow the blade to slip and prevent damage to the shaft which would otherwise occur from torsional stresses. For relief against the shear stresses a spacer element 26 is provided between the bolt 17 and the blade 13.

Figure 2:
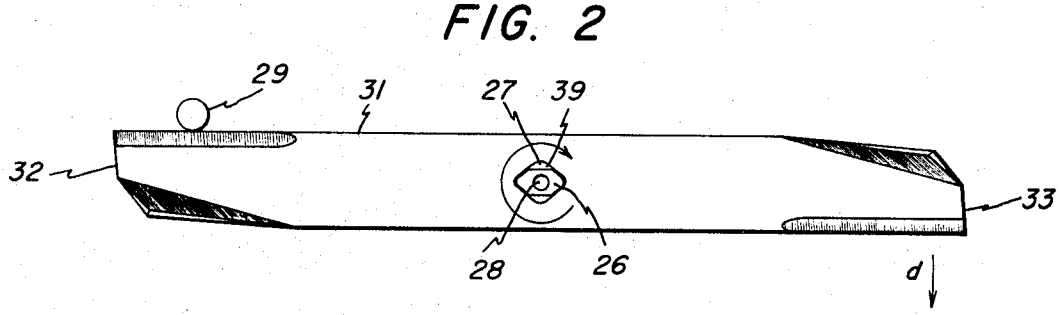
FIG. 2 is a top view of the blade and spacer portion of the assembly.

Referring now to FIG. 2 the blade 13 is shown with the spacer element 26 inserted in the aperture 27 formed in the center of the blade. The spacer element 26 is formed from a relatively resilient or soft material such as plastic, aluminum, or brass which will be deformed by a predetermined force. A preferred material has been found to be a polycarbonate having the trade name LEXAN. It is provided with a mounting hole 28 to accept the motor shaft, and its periphery has a specific differential shape with respect to the aperture 27 as will be described hereinafter.

Should the rotating blade 13 strike a relatively immovable object 29, such as a steel stake or the like, at its contact side 31 near its one end 32, the opposite end 33 will tend to maintain its momentum in the direction shown by the arrow $d$. The central portion of the blade will tend to shift as well, and the resulting shear stress exerted on the shaft or mounting bolt may bend or break one or both of them. The spacer element 26 is provided to allow a shifting of the blade aperture axis with respect to the shaft axis and thereby relieve the forces that would be exerted thereon.

Figure 3:
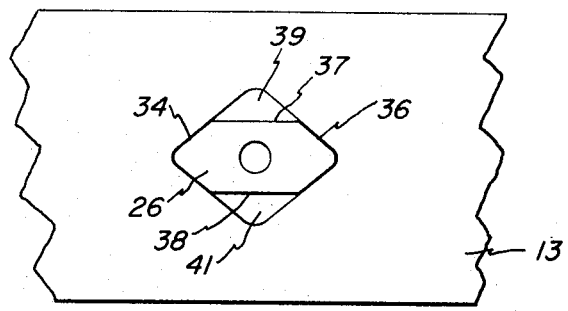
FIG. 3 is an enlarged view of the central portion thereof.

Referring to FIG. 3 a preferred installation is shown wherein the aperture 27 is diamond-shaped with its vertices aligned in the blade longitudinal and transverse planes. The spacer element 26 inserted therein is shaped such that its longitudinal sides 34 and 36 conform substantially to the aperture walls, and its lateral sides 37 and 38 are spaced from the lateral sides of the aperture so as to define cavities 39 and 41, respectively. The cavities 39 and 41 are oriented so that their longitudinal cross section decreases in length as the distance from the center of the aperture is increased. They provide space into which the spacer element 26 may be moved when a lateral force is imparted thereto. Initial movement is facilitated by relatively high degree of elasticity followed by a subsequent decreasing degree of elasticity.

In a typical occurrence, where the blade 13 strikes a stake 29 as shown in FIG. 2 the blade at its central section is forced in the direction of arrow $d$. The bolt 17 will tend to remain stationary and thus cause the resilient spacer 26 to be deformed toward the cavity 39. Slight deviations wherein the elastic limit is not exceeded will allow the spacer 26 to return to its central position when the force is relieved. Greater deviations will cause a permanent deformation of the spacer into the cavity 39 and will thus require replacement thereof since the axis of the aperture and that of the bolt 17 will no longer coincide. In such a case, as the spacer is deformed to occupy the cavity 39 the degree of elasticity will decrease until the cavity is substantially filled. If the momentum has then not been arrested the spacer may then be forced out of the aperture in a semi-liquid state to provide further cushioning effect.

Figure 4:
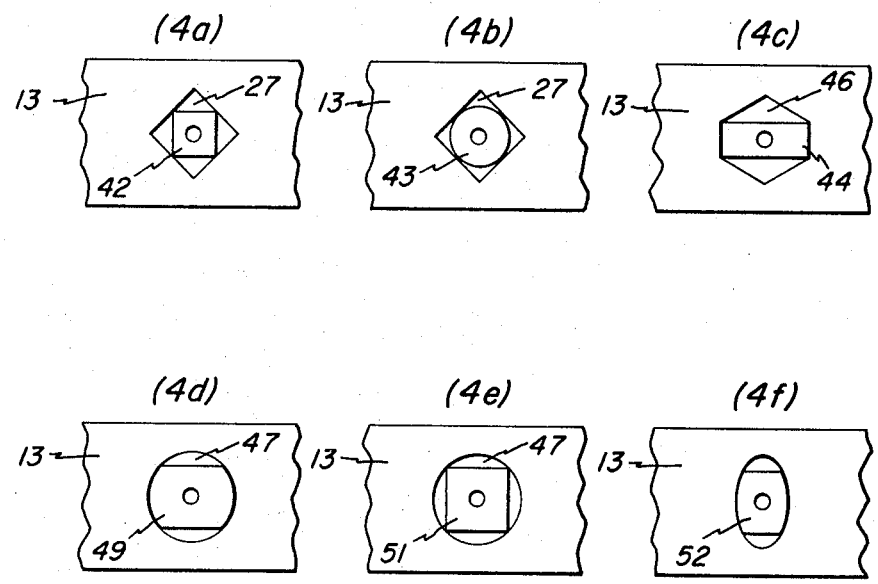
FIG. 4a through f show various modified embodiments of the blade and spacer combination.

FIG. 4a through $f$ illustrates various modified embodiments of the invention which may be used. FIGS. $a$ and $b$ show a square shaped aperture 27 with square and round spacers 42 and 43 inserted therein. Although restraint in the longitudinal plane is less than that for the preferred embodiment of FIG. 3 the lateral cavity structure is similar in that the longitudinal cross section decreases in length as the lateral distance from the center is increased to thereby provide a decreasing degree of elasticity. It should be noted that in an installation such as FIG. 4a some means must be provided to maintain the proper radial orientation of the spacer with respect to the aperture.

FIG. 4c shows another modified embodiment wherein the aperture 44 is modified to have a rectangular central portion and the spacer 46 is accordingly of a similar shape. Such an arrangement provides a high degree of longitudinal restraint and a high degree of lateral elasticity.

FIG. 4d and 4e present a round aperture 47 and FIG. 4f illustrates an oval aperture with its major axis in the blade longitudinal plane. The respective spacers 49, 51 and 52 are of any convenient shape to allow longitudinal restraint, and yet provide the lateral cavities of decreasing longitudinal cross sectional length. It should again be noted that with these apertures provision must be made to maintain the proper radial orientation of the spacer with respect to the aperture.

As seen in FIG. 1 the thickness of the spacer 26 is preferably substantially equal to that of the blade 13 to ensure the proper mating relationship of the washers 18 and 19 with the blade surfaces.

What I claim as new and desire to secure by Letters Patent of the United States is:

1. A cutting blade arrangement for a mower of the rotary type comprising:
   a. an elongate blade disposed in a substantially horizontal plane and having formed therein at its mid point an aperture through which a significantly smaller rotatable shaft extends downwardly therethrough, said aperture having a shape such that its longitudinal cross section is of decreasing length as the transverse distance from the center of the aperture is increased;
   b. a resilient spacer element disposed in said aperture between said shaft and said blade, said spacer having its control portion conforming substantially to and closely surrounding said shaft, each of its longitudinal sides impinging against said blade at at least two points, and each of its transverse sides impinging against said blade at two displaced points with that portion of said spacer between said two displaced points being spaced from said blade to define a cavity; and
   c. means for securing said blade to said shaft for mutual rotation therewith whereby when the rotation of said blade is interrupted by contact with a relatively immovable object, the resulting shear stress causes said spacer to deform and tend to fill said cavity adjacent the side of the blade with which contact is made.

2. A cutting blade arrangement as set forth in claim 1 wherein said aperture is diamond-shaped with its opposite vertices aligned in the longitudinal and transverse planes.

3. A cutting blade arrangement as set forth in claim 2 wherein said spacer element is a truncated diamond in shape, having its transverse vertices removed to provide said cavities.

4. A cutting blade arrangement as set forth in claim 1 wherein said spacer element is substantially rectangular in shape with its sides aligned in the longitudinal and transverse planes respectively.

5. A cutting blade arrangement as set forth in claim 1 wherein said spacer element is substantially round in shape.

6. A cutting blade arrangement as set forth in claim 1 wherein said aperture is hexagon-shaped with a pair of sides aligned in the transverse plane, and further wherein said spacer element is rectangular in shape and is disposed with two sides in contiguous relationship with said aligned sides.

7. A cutting blade arrangement as set forth in claim 1 wherein said aperture is substantially round in shape.

8. A cutting blade as set forth in claim 7 wherein said spacer element is substantially square in shape with its sides aligned in the longitudinal and transverse planes respectively.

9. A cutting blade as set forth in claim 1 wherein said aperture is substantially oval in shape and aligned with its longer axis in the transverse plane.

10. A cutting blade as set forth in claim 1 wherein the thickness of said spacer is substantially equal to the thickness of said blade.

11. A cutting blade arrangement as set forth in claim 1 wherein said securing means comprises:
   a. a hub secured to said shaft above said blade with its lower surface in frictional engagement with said blade;
   b. a hub plate secured to said shaft below said blade with its upper surface in frictional engagement with said blade; and
   c. means for biasing said hub and said plate together to frictionally engage said blade for mutual rotation therewith.

12. A cutting blade arrangement as set forth in claim 11 wherein said hub is secured from relative rotation on said shaft by a key disposed therebetween.

13. A cutting blade arrangement as set forth in claim 12 and including a fibre washer disposed in close-fit relationship between said blade and each of said hub and said plate.

14. A cutting blade arrangement for a mower of the rotary type comprising:
   a. a shaft extending downwardly for rotation on a substantially vertical axis;
   b. a hub secured to the lower end of said shaft for rotation therewith said hub having a substantially planar bottom portion;
   c. an elongate blade disposed in a substantially horizontal plane with its upper surface engaging said hub bottom portion, said blade having formed therein at its midpoint an aperture with a shape such that its longitudinal cross section is of decreasing length as the transverse distance from the center of the aperture is increased;
   d. a resilient spacer element disposed in said aperture said spacer having a central hole formed therein and having each of its longitudinal sides impinging against said blade at at least two points, and each of its transverse sides impinging against said blade at two displaced points with that portion of said spacer between said two displaced points being spaced from said blade to define a cavity;
   e. a hub plate disposed below said blade with its upper surface in frictional contact with said blade, said plate having a central hole formed therein;
   f. and a bolt extending upwardly through said plate and spacer central holes to the core of said shaft, thereby biasing the combination of said shaft, hub, blade, spacer and hub plate into an integral rotatable unit.

* * * * *